(No Model.)  
2 Sheets—Sheet 2.

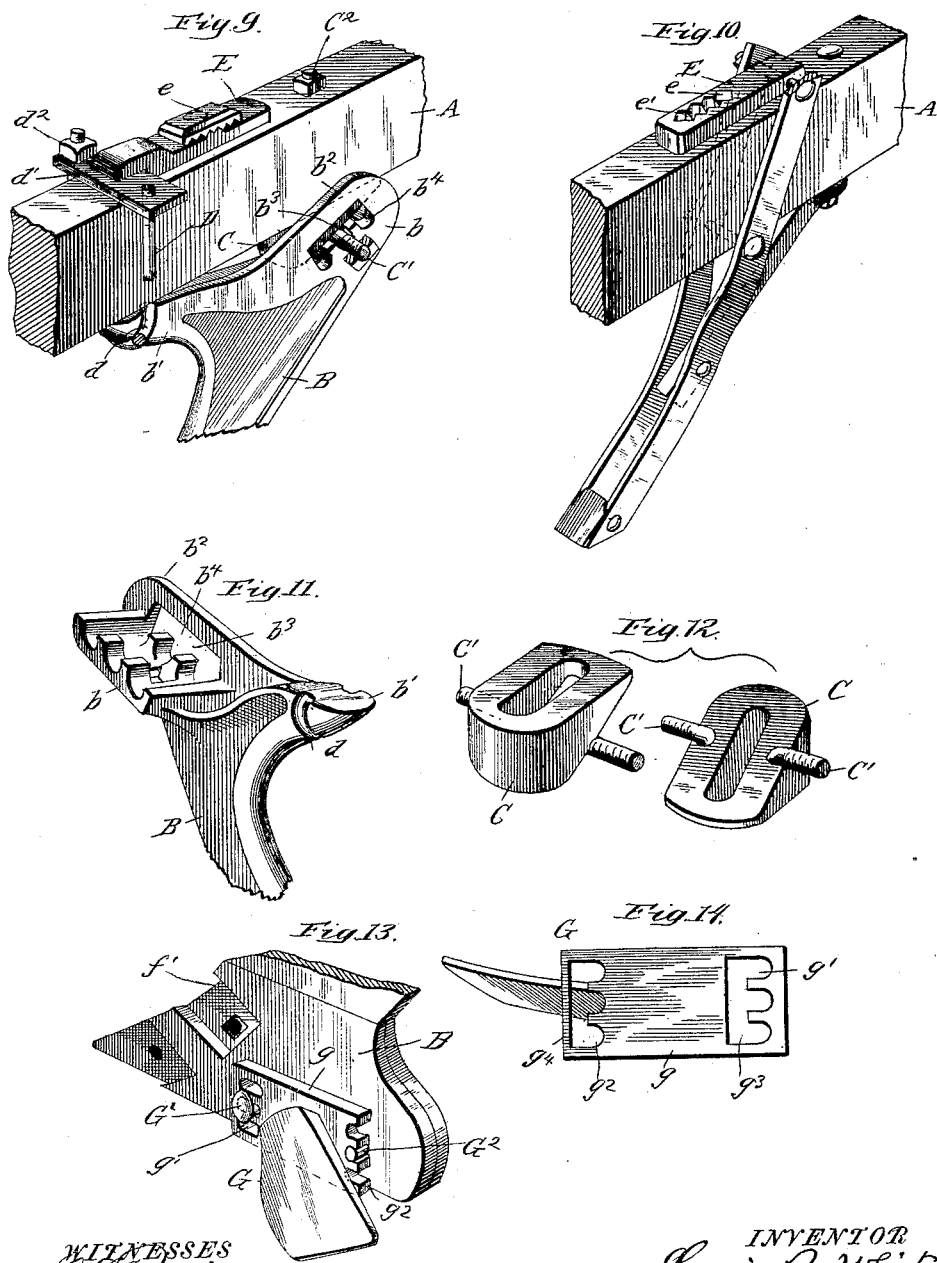

L. B. WHITE.
PLOW.

No. 419,165.  Patented Jan. 7, 1890.

WITNESSES  
C. H. Kander  
Van Buren Hillyard

INVENTOR  
Lewis B. White  
By R. S. & A. P. Lacey  
Attorneys

UNITED STATES PATENT OFFICE.

LEWIS B. WHITE, OF NORFOLK, VIRGINIA.

PLOW.

SPECIFICATION forming part of Letters Patent No. 419,165, dated January 7, 1890.

Application filed January 14, 1889. Serial No. 296,321. (No model.)

*To all whom it may concern:*

Be it known that I, LEWIS B. WHITE, a citizen of the United States, residing at Norfolk, in the county of Norfolk and State of Virginia, have invented certain new and useful Improvements in Plows; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to plows, and has for its object to strengthen the connection between the point and the standard by making the open socket shown in my patent, No. 313,394, issued March 3, 1885, closed. Experience has shown that this open socket is all that can be desired in a certain class and grades of plows, particularly in heavy plows, but in other classes and grades of plows is objectionable, in that the parts oftentimes break when the point comes in contact with a root or other obstruction. This objection is partially obviated by making the bottom flange of this open socket thicker than usual; but to make this flange thicker brings it too near the ground, which prevents the plow penetrating or going in the ground the proper distance. By having the socket which receives the end of the standard closed, the bottom flange or wall thereof can be made comparatively thin, and by extending it back some distance on the share the standard and the share are each strengthened.

A further object of the invention is to provide means for securing different-sized standards to the beam and for securing wings of different styles to the lower end of the standard, the latter being recessed on its side and the said wing having a rearwardly-projecting lug, which is fitted in said recess and bolted to the standard.

A still further object of the invention is to devise a novel means for adjustably connecting the sweep with the standard without the necessity of removing the fastening-bolts.

The improvement consists in the novel features and the peculiar construction and combination of the parts, which will be hereinafter more fully described and claimed, and shown in the annexed drawings, in which—

Figure 1:
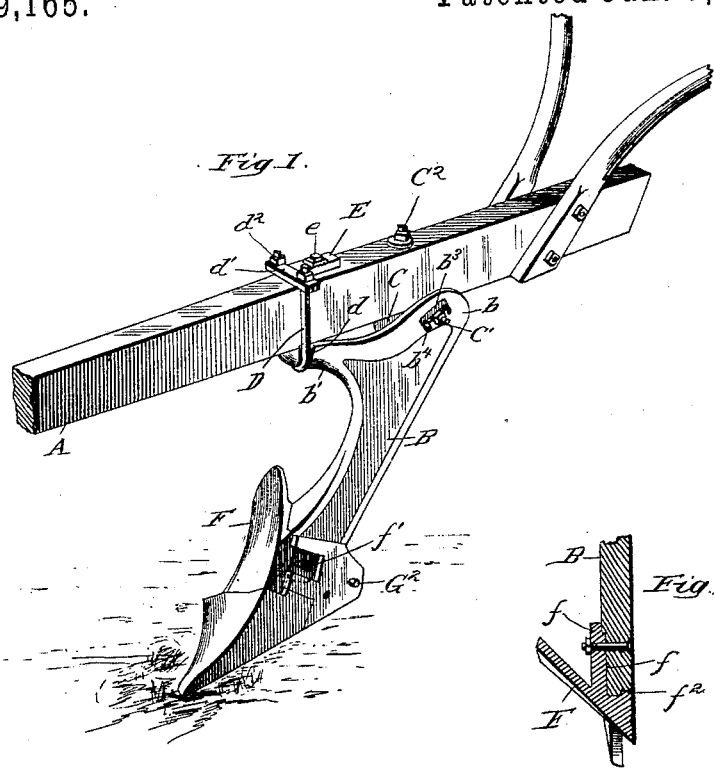
Figure 4:
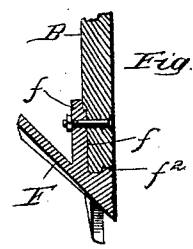
Figure 2:
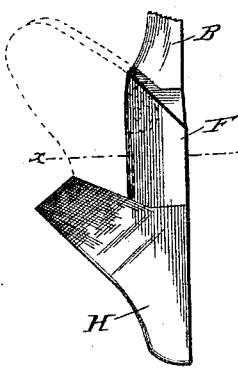
Figure 3:
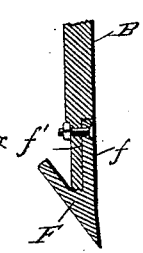
Figure 5:
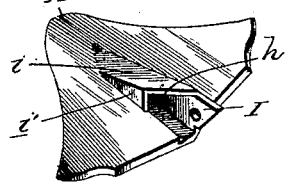
Figure 6:
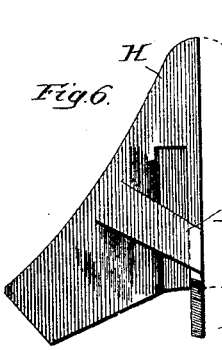
Figure 7:
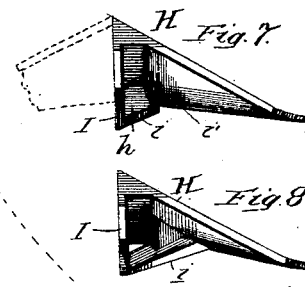
Figure 8:
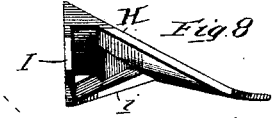

Figure 1 is a perspective view, parts being broken away, of a plow embodying my invention; Fig. 2, a front view of the lower end of the standard, showing the casting or breast in full lines and the mold-board in dotted lines; Fig. 3, a cross-section, parts being broken away, of the point and the standard about on the line X X of Fig. 2; Fig. 4, a view, similar to Fig. 3, of a modification; Fig. 5, a bottom perspective view of a double-winged point; Fig. 6, a bottom plan view of a modified form of point, showing a second wing by dotted lines; Fig. 7, a rear end view of the point shown in Figs. 1 and 2, showing a second wing by dotted lines; Fig. 8, a rear end view of the point shown in Fig. 6; Fig. 9, a perspective view, parts being broken away, of the upper end of the standard, showing the manner of securing it to the beam, on an enlarged scale; Fig. 10, a perspective view showing the adjustable holder applied to a modified form of standard; Fig. 11, a perspective view of the upper end of the standard; Fig. 12, top and bottom perspective views of the wedge; Fig. 13, a perspective view of the sweep, showing the manner of securing it to the standard; and Fig. 14, a rear end view of a modified form of sweep.

The beam A rests on the front and rear bearings $b'$ and $b$, respectively, of the standard B, and is secured to the said standard by the clip D, which embraces the front bearing $b$, being fitted in a groove or channel $d$ therein and the sides of the beam, the upper ends of the clip being threaded and passed through openings in the cross-bar $d'$, and provided with the nuts $d^2$ for tightening the clip on the bearing $b$ and beam A, and by the bolt $C^2$, which passes vertically through the rear bearing $b$ and the beam A. The flange $b^2$, projecting vertically from the bearing $b$, is designed to extend up alongside of the beam, and is provided with a longitudinal slot $b^3$ and a series of vertical slots $b^4$, extending from the slot $b^3$. The wedge C, interposed between the under side of the beam and the bearing $b$, has one of its threaded arms $C'$ extending through the slot $b^3$ and adapted to be inserted in any one of the vertical slots $b^4$. This wedge C is adjustable lengthwise of the beam, and its threaded arms rest in grooves in the bearing $b$, which correspond with and form prolongations of the vertical slots $b^4$. To adjust the wedge the bolt $C^2$ must be loosened enough to permit the threaded arms $C'$ to be disengaged from the slots $b^4$. When the wedge is adjusted, the bolt $C^2$ is again tightened and the parts are firmly held together.

The holder E, adjustably held on the beam A, engages with the cross-bar $d'$ or other fastening for the standard, and secures it against any fore-and-aft movement on the beam, and may abut against the rear side of the cross-bar simply, and may or may not have a lip to extend over the same, or may be recessed to receive or fit over the said cross-bar or other fastening device. In the first instance the holder must be arranged in the rear of the said cross-bar to withstand the strain which constantly tends to force the cross-bar toward the rear end of the beam. In the latter case it makes little or no difference how the holder is arranged, whether in front or in the rear of the cross-bar, as it engages with each side. The fastening-bolt $e$ passes through the beam and through a slot $e'$ in the holder, and its head may fit in corresponding notches in the edges of the slot to hold the holder against accidental displacement; or the bolt may pass through a washer which is transversely corrugated or otherwise roughened on its under side to engage with corresponding corrugations or roughness on the upper side of the holder to secure the said holder against movement on the beam. The fastening-bolt may be the vertical bolt $C^2$ or a separate bolt provided for the purpose. In case the standard has two members or branches which embrace the sides of the beam and is clamped to the beam by two transverse bolts—one above the other below the beam—the holder may be applied to either (preferably the upper) of the two bolts in precisely the same manner as it is applied to the cross-bar $d'$, Fig. 10.

The casting, breast, or mold-board F, fitted to the lower end of the standard B, is provided with the rearwardly-extending lug $f$, which fits in the recess $f'$ in the side of the standard, and which is bolted to the said standard. This lug $f$ may be arranged near the outer edge of the said casting, as shown in Fig. 3, so as to receive the standard between it and the wing F; or it may be set in from the edge of the said casting or wing, as shown in Fig. 4, the edge being extended to rest against the front of the standard, and having a rear flange or rib $f^2$, which embraces the sides of the standard between it and the said lug. The upper end of this casting or wing F inclines rearwardly and upwardly, and the standard immediately above the said casting or wing is brought forward to meet the said inclined end to form a lock-joint. By this construction the earth breaks over the angle of the said casting below the said lock-joint, which is thereby preserved intact. The shank $g$ of the sweep G is provided at its front end with a series of slots $g'$ and at its rear end with a series of corresponding notches $g^2$. The fasting-bolt $G'$, passing through one of the slots $g'$, holds the sweep to place. The stud $G^2$, projecting from the side of the standard, is designed to enter one of the notches $g^2$ and strengthen the shank of the sweep and prevent any possible movement. To adjust the pitch of the sweep the bolt G is slackened and the sweep pushed forward until the stud $G^2$ clears the notches $g^2$ in the end of the shank $g$. The sweep, being adjusted by bringing the proper notch $g^2$ opposite the stud $G^2$, is engaged with the stud $G^2$ by being pushed back, and is held to place by re-tightening the said bolt. To adjust the sweep up or down the bolt $G'$ must be removed and placed in the desired slot $g'$. However, to obviate the necessity of removing the bolt, the slots may be connected by a vertical slot $g^3$, which admits of the sweep being adjusted to bring the bolt $G'$ in any one of the slots $g'$. The rear end may be spanned by a cross-bar $g^4$, which is so disposed as to form a vertical and lateral slots, which correspond with the vertical and lateral slots $g^3$ $g'$ at the front end of the shank.

The point H, which may single or double, according to the nature of the plow, is provided with a closed socket $h$, which embraces the point or lower end of the standard on the top, bottom, and one side, or on all sides. This socket is formed by the depending lug I and the lateral extension $i$, which projects from the lower end of the lug and connects with the wing of the point. This extension $i$ may be a bar, as shown in Figs. 6 and 8, or it may extend to the junction of the front end of the lug I with the wing and have its edge $i'$ bent up at about right angles and connected with the wing of the point, as shown in Figs. 5 and 7. In the latter case the bent portion $i'$ extends about parallel with the lug I and projects back some distance to strengthen the point of the standard. The lug is in a vertical plane, and its extension $i$, being at right angles to the lug, forms an approximately triangular-shaped socket with the wing which inclines to the lug. The point or lower end of the standard is correspondingly triangular-shaped in cross-section to fit the socket. The lug I projects back some distance and is bolted to the side of the standard, and the rear end of the extension $i$ may incline or taper to the said lug to obtain a greater purchase on the rear or bottom edge of the standard to strengthen the point of the said standard and to prevent the point of the plow from rocking or tilting in the event of its fastening-bolt becoming loose. It will be observed that the front bearing has its sides projecting beyond the sides of the beam about the thickness of the clip, so that the latter may be nearly embedded in the groove or channel therein and fit against the sides of the beam. By having the clip nearly embedded in the groove in the said bearing it offers no obstruction for the lodgment of trash, weeds, &c.

Obviously, instead of the single bolt G' and the stud G², two fastening-bolts may be employed, the stud G² being replaced by a bolt, and instead of the several slots being formed in the shank of the sweep they may be formed in the standard B, and the shank $q$ of the sweep may have two bolt-openings or one bolt-opening and a stud.

Having thus described my invention, what I claim, and desire to secure by Letters Patent, is—

1. The combination, with the beam and the standard having a bearing which is adapted to come beneath the beam and project at its sides beyond the sides of the said beam, and having a channel or groove beneath and on its two sides, the beam adapted to tilt vertically and laterally on said bearing, of a clip inserted from beneath and embracing the bearing and sides of the beam and fitted in the said channel or groove and forming the fulcrum for the tilting beam and holding the beam to the standard at all times, substantially as described.

2. The combination, with the beam and the standard having a bearing and a vertical flange projecting from the said bearing, the said flange having a longitudinal slot and a series of vertical slots communicating with the said longitudinal slot, of the wedge interposed between the bearing and the beam and having an arm to be inserted in one of the said vertical slots in the flange, substantially as set forth.

3. The combination, with the beam and the standard provided with a bearing which is transversely grooved on its upper side, and having a vertical flange which is provided with a longitudinal slot and vertical slots corresponding with the transverse grooves and communicating with the longitudinal slot, of the wedge placed between the beam and the bearing and having arms to fit in said grooves and extend through the said slots in the flange of the bearing, substantially as described.

4. The combination, with the beam, the standard, and a fastening adapted to span or extend around the beam, of the holder longitudinally adjustable on the beam and adapted to engage with the said fastening, substantially as and for the purpose described.

5. The combination, with the beam, the standard, and the fastening for the standard extending across the beam, of the adjustable holder engaging with the said fastening and having a lip to extend over the fastening, substantially as set forth.

6. The combination, with the beam and the standard-fastening, of the bolt $e$, held to the beam, the washer mounted on the bolt and having teeth on its under side, and the holder between the beam and the said washer and adjustable on the said beam and having teeth to engage with the teeth on the washer, substantially as described.

7. The combination, with the standard having a recess on its inner side, of the breast or similar casting having a rearwardly-projecting lug fitted to the standard and having a portion projecting in an opposite direction to the wing of the casting and bearing against the front edge of the standard, substantially as and for the purpose described.

8. The combination, with the standard having a recess in its side, of the breast or similar casting having a rearwardly-projecting lug to fit in the said recess and having a portion extended in an opposite direction to the wing of the casting to bear on the front edge of the standard, said extended portion having a rear flange $f^2$ to overlap the side of the said standard, substantially as and for the purpose described.

9. The combination, with the standard having a stud, as $G^2$, of the sweep having its shank provided with corresponding notches or openings near or at each end, the notches at one end receiving the said stud, and a fastening-bolt to be inserted in the notches at the other end, substantially as described.

10. The combination, with the standard having a stud, as $G^2$, of the sweep having a series of notches at its rear end and a vertical and horizontal slots communicating with the vertical slot at its front end, and the bolt adapted to be inserted in the said vertical and horizontal slots, substantially as described.

11. The hereinbefore-specified plow-point, having a depending lug I and a lateral projection $i$, extending from the lower end of the said lug I and connected at its outer end with the wing, the wing, lug, and projection being integrally formed, substantially as set forth.

12. The herein-described plow-point, having a closed socket formed by a depending lug, as I, which has a lateral projection, the end of the said projection being bent up and connected with the wing of the point, substantially as described.

13. The combination, with the point having the rear end of the bottom of the socket tapering or inclining rearwardly, of the standard having its end fitted in said socket and having the said tapering or inclined end bearing on its lower edge, substantially as and for the purpose described.

14. The combination, with the standard having a bearing provided with a series of depressions, of a wedge adapted to move laterally and longitudinally on the said bearing and having arms or projections on its under side corresponding with and adapted to fit in the depressions in the said bearing, substantially as described.

15. The hereinbefore-described wedge for adjusting a plow-beam relative to its standard, having threaded arms, which arms extend in opposite directions and are adapted to receive adjusting-nuts, substantially as described.

In testimony whereof I affix my signature in presence of two witnesses.

LEWIS B. WHITE.

Witnesses:
S. P. MOORE,
C. PICKETT.